United States Patent Office 2,812,287
Patented Nov. 5, 1957

2,812,287

EMPLOYMENT OF AMIDE OF PROPIONIC ACID IN PRODUCTION OF ERYTHROMYCIN

Herman Hoeksema and Lionel E. Rhuland, Kalamazoo Township, Kalamazoo County, Mich., assignors to The Upjohn Company, Kalamazoo, Mich., a corporation of Michigan No Drawing. Application June 12, 1953,
Serial No. 361,425

4 Claims. (Cl. 195—80)

This invention relates to the fermentation culturing of erythromycin ferment and is particularly directed to methods and compositions for obtaining improved yields of erythromycin characterized by the incorporating in the erythromycin substrate medium of a water-soluble amide of propionic acid.

It is an object of the invention to provide new and improved processes for producing erythromycin. It is another object of the invention to provide new and improved substrate media for culturing erythromycin ferment. It is another object of the invention to provide adjuvants which when added to erythromycin substrate media, function to increase the yield of erythromycin. Still other objects will appear as the description proceeds.

These objects are accomplished in the present invention by incorporating in the erythromycin substrate medium used in culturing the erythromycin ferment a water-soluble amide of propionic acid in an amount sufficient to stimulate the production of erythromycin. Through the addition of water-soluble amides of propionic acid to erythromycin substrate and culturing erythromycin ferment therein, a yield of erythromycin is obtained which is substantially greater than the yield obtainable in the absence of water-soluble amides of propionic acid.

In carrying out the processes of the invention, an erythromycin ferment, such as *Streptomyces erythreus* NRRL 2338, is cultured in an erythromycin substrate medium according to the invention using procedures and apparatus well understood in the art. See U. S. Patent 2,653,899 and Antibiotics and Chemotherapy 2: 281–283 (June 1952). The fermentation is carried out under aerobic conditions and advantageously by the submerged culture process. Initially the substrate medium is adjusted to between pH 6.0 and pH 7.5, advantageously to about pH 6.5. In the fermentation the pH ordinarily increases up to about pH 9. Suitably the temperature may range between about 25 degrees centigrade and about 37 degrees centigrade, advantageously between 26 and 32 degrees centigrade. In these and other respects the procedure outlined in the above U. S. Patent 2,653,899 can be advantageously followed.

The basic erythromycin substrate is carbohydrate. Preferred sources of carbohydrate are starch and dextrose (glucose). Other sources which can be included, or substituted for starch and dextrose, are sucrose, dextrin, molasses, brown sugar, maltose, and the like. The erythromycin substrate media advantageously contain in addition, nitrogen sources, preferably such organic nitrogen sources as corn steep, soy bean meal or flour, distiller's solubles, casein, amino acid mixtures, peptones (both meat and soy), brewer's yeast, peanut granules, peanut meal, and the like. Inorganic nitrogen sources such as nitrate salts or ammonium salts can also be employed. The substrate media also can contain nutrient inorganic salts which furnish sodium, potassium, calcium, phosphate, chloride, sulfate, and like ions. Essential trace elements such as cobalt, magnesium, iron, and manganese can be added though sufficient amounts of such elements are ordinarily supplied by the other constituents of the substrate medium.

A suitable basic erythromycin substrate medium advantageously contains from about 0.5 to about ten percent carbohydrate sources, from about 0.5 to about five percent nitrogen sources, up to about one percent nutrient salts, up to about 0.5 percent calcium carbonate or like buffer salt, and the balance substantially all water. To this basic erythromycin substrate medium there is added in accordance with the invention a water-soluble amide of propionic acid in an amount sufficient to stimulate the production of erythromycin. Ordinarily the amount of material will not exceed about one percent. Any smaller amount down to the minimal effective concentration can be used. Ordinarily it is not desirable to use less than about 0.1 percent though effective stimulation has been observed at lower concentrations down to about 0.05 percent. (The parts and percentages used herein are by weight unless otherwise specified.)

The adjuvant material according to the invention advantageously is added to the erythromycin substrate medium prior to or at the time of inoculation. It can be added before the substrate medium is sterilized or sterile material can be added thereafter but prior to inoculation. The desired quantity of said adjuvant material can be added all at the beginning or at periodic intervals during the fermentation. In the latter case, the adjuvant can be added in an aggregate amount greater than one percent.

Suitable adjuvants according to the invention which can be added to basic erythromycin substrate media to increase erythromycin production, include propionamide and other water-soluble amides such as mono and di-N-lower alkyl amides where the lower alkyl group is methyl, ethyl, n-propyl, and n-butyl, or the like.

The invention can now be more fully understood by the following examples which are illustrative of the processes and composition of the present invention, but are not to be construed as limiting.

Example 1

A sporulated culture is produced by growing *Streptomyces erythreus* strain NRRL 2338 on a nutrient agar slant. The spores are recovered in water suspension and used to inoculate a substrate medium suitable for producing a vegetative growth. The spore suspension is introduced into a 500-mil flask containing 100 mils of the following sterile substrate medium:

| | | |
|---|---|---|
| Dextrose (technical grade) | grams | 10 |
| Beef extract | do | 10 |
| Sodium chloride | do | 5 |
| Bacto-peptone | do | 5 |
| Water | mils | 1000 | and incubated at 28.5 degrees centigrade for three days on a reciprocal shaker.

Five-mil portions of the vegetative culture thus obtained are introduced into flasks containing 100 mils of erythromycin substrate medium and incubated on reciprocal shakers at 28.5 degrees centigrade for seven days, assays being taken on the fifth, sixth, and seventh days.

The results obtained are given in the following table in which the various adjuvants listed were added to the following erythromycin substrate medium in the proportions indicated in the table:

| | | |
|---|---|---|
| Technical dextrose | grams | 25 |
| Soya bean meal (partially defatted) | do | 25 |
| Brewer's yeast (debittered) | do | 5 |
| Sodium chloride | do | 5 |
| Calcium carbonate | do | 2 |
| Water | mils | 1000 |

Table I

EFFECT OF PROPIONAMIDE ON YIELD OF ERYTHROMYCIN

FIRST SERIES

| Adjuvant | Concentration in percent | Assay, Micrograms/mil | | |
|---|---|---|---|---|
| | | 5 day | 6 day | 7 day |
| None | 0 | 200 | 263 | 184 |
| Propionamide | 0.4 | 315 | 520 | 390 |

SECOND SERIES

| None | 0 | <125 | 148 | 145 |
| Propionamide | 0.4 | 308 | 393 | 285 |

In all cases initial pH was about 6.6.

It is to be understood that the invention is not limited to the exact details of operation or exact compounds shown and described as obvious modifications and equivalents will be apparent to one skilled in the art and the invention is therefore to be limited only by the scope of the appended claims.

We claim:

1. In the manufacture of erythromycin by the fermentation culturing of *Streptomyces erythreus*, the method which comprises culturing *Streptomyces erythreus* in an erythromycin substrate medium containing about 0.05 to about one percent of a water-soluble amide of propionic acid.

2. In the manufacture of erythromycin by the fermentation culturing of *Streptomyces erythreus* in a substrate medium containing assimilable carbohydrate, protein, and minerals, the improvement which comprises adding to said substrate medium a stimulating amount greater than about 0.05 percent of a water-soluble amide of propionic acid.

3. In the manufacture of erythromycin by the fermentation culturing of *Streptomyces erythreus*, the method which comprises culturing *Streptomyces erythreus* in an erythromycin substrate medium containing about 0.05 to about one percent of propionamide.

4. In the manufacture of erythromycin by the fermentation culturing of *Streptomyces erythreus* in a substrate medium containing assimilable carbohydrate, protein and minerals, the improvement which comprises adding to said substrate medium a stimulating amount greater than about 0.05 percent of propionamide.

References Cited in the file of this patent

UNITED STATES PATENTS 2,653,899    Bunch et al. _____ Sept. 29, 1953

OTHER REFERENCES

Porter: Bacterial Chemistry and Physiology, Wiley, 1946, page 843.